(12) United States Patent
Matsushita

(10) Patent No.: US 9,634,358 B2
(45) Date of Patent: Apr. 25, 2017

(54) METHOD FOR PRODUCING ALL-SOLID-STATE BATTERY, AND ALL-SOLID-STATE BATTERY

(71) Applicant: TOYOTA JIDOSHA KABUSHIKI KAISHA, Toyota-shi, Aichi-ken (JP)

(72) Inventor: Yuki Matsushita, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 115 days.

(21) Appl. No.: 14/576,977

(22) Filed: Dec. 19, 2014

(65) Prior Publication Data

US 2015/0188195 A1  Jul. 2, 2015

(30) Foreign Application Priority Data

Dec. 26, 2013 (JP) ................................. 2013-269027

(51) Int. Cl.

| | |
|---|---|
| *H01M 6/46* | (2006.01) |
| *H01M 10/0585* | (2010.01) |
| *H01M 10/0525* | (2010.01) |
| *H01M 10/04* | (2006.01) |
| *H01M 10/0562* | (2010.01) |
| *H01M 10/0565* | (2010.01) |

(52) U.S. Cl.
CPC ... *H01M 10/0585* (2013.01); *H01M 10/0468* (2013.01); *H01M 10/0525* (2013.01); *H01M 10/0562* (2013.01); *H01M 10/0565* (2013.01); *Y02P 70/54* (2015.11); *Y10T 29/49115* (2015.01)

(58) Field of Classification Search
CPC ......... H01M 10/0585; H01M 10/0525; H01M 10/0468; H01M 10/0565; H01M 10/0562; Y02E 60/122; Y10T 29/49115; Y02P 70/54
USPC .............................................. 429/152, 623.5
See application file for complete search history.

(56) References Cited

U.S. PATENT DOCUMENTS

| | | | |
|---|---|---|---|
| 2008/0118826 A1* | 5/2008 | Shimamura | H01M 6/48 429/129 |
| 2009/0202912 A1 | 8/2009 | Baba et al. | |

(Continued)

FOREIGN PATENT DOCUMENTS

| | | |
|---|---|---|
| JP | S60-1768 A | 1/1985 |
| JP | 2000-030747 A | 1/2000 |

(Continued)

*Primary Examiner* — Gary Harris
(74) *Attorney, Agent, or Firm* — Oliff PLC

(57) ABSTRACT

An objective of the invention is to provide a method for producing an all-solid-state battery with fewer steps for minimizing warping than in the prior art, and an all-solid-state battery with lower warping. This is achieved by a method comprising the steps of: (A) disposing a first electrode active material layer on both sides of a first collector to form a first electrode layer, (B) disposing a solid electrolyte layer on each of the first electrode active material layers, (C) disposing a second electrode active material layer and a second collector on the solid electrolyte layers, in such a manner that the second electrode active material layers contact with the solid electrolyte layers, (D) pressing a stack formed in steps (A) to (C), to form a battery unit, (E) repeating steps (A) to (D) to form a plurality of battery units, and (F) stacking the plurality of battery units.

6 Claims, 8 Drawing Sheets

(56) References Cited

U.S. PATENT DOCUMENTS

| | | |
|---|---|---|
| 2010/0040952 A1 | 2/2010 | Kimura et al. |
| 2013/0260023 A1 | 10/2013 | Suyama et al. |
| 2014/0227606 A1* | 8/2014 | Suzuki .................. H01M 4/131 |
| | | 429/304 |
| 2015/0132638 A1 | 5/2015 | Adachi et al. |

FOREIGN PATENT DOCUMENTS

| | | |
|---|---|---|
| JP | 2001-015152 A | 1/2001 |
| JP | 2001-126756 A | 5/2001 |
| JP | 2006-185662 A | 7/2006 |
| JP | A-2008-235227 | 10/2008 |
| JP | 2010-272210 A | 12/2010 |
| JP | 2011-044368 | 3/2011 |
| JP | A-2013-098135 | 5/2013 |
| JP | 2013-114966 A | 6/2013 |
| KR | 20090030271 A | 3/2009 |
| WO | WO 2012/077197 A1 | 6/2012 |
| WO | 2013080540 A1 | 6/2013 |

* cited by examiner

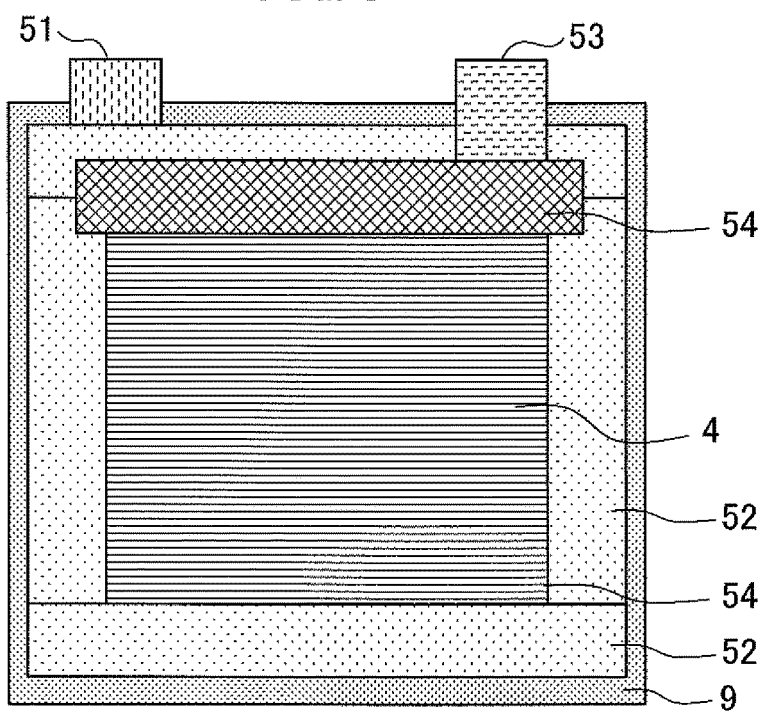
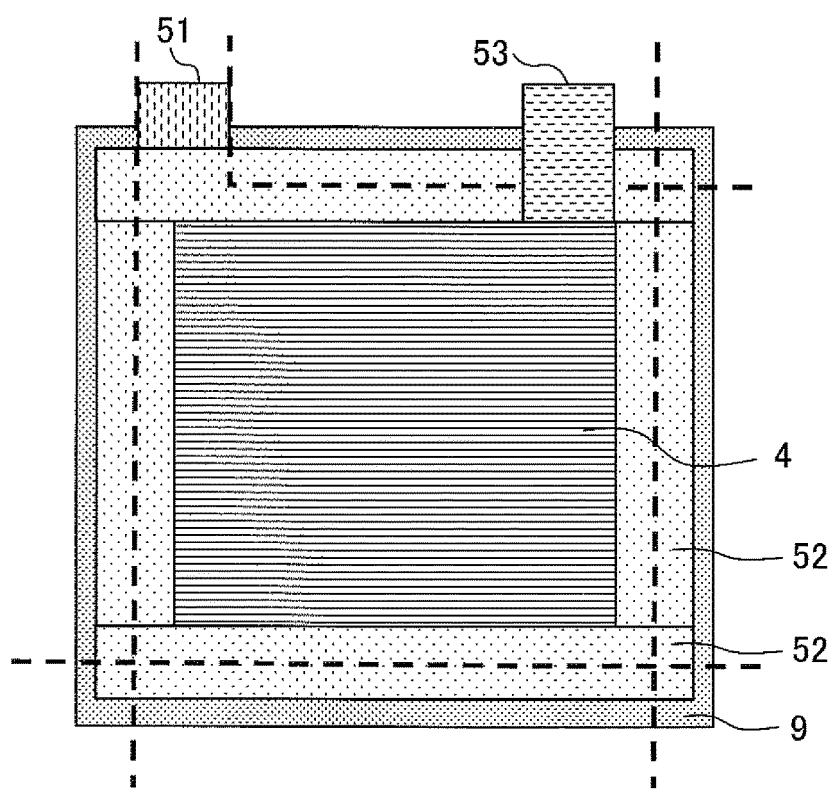

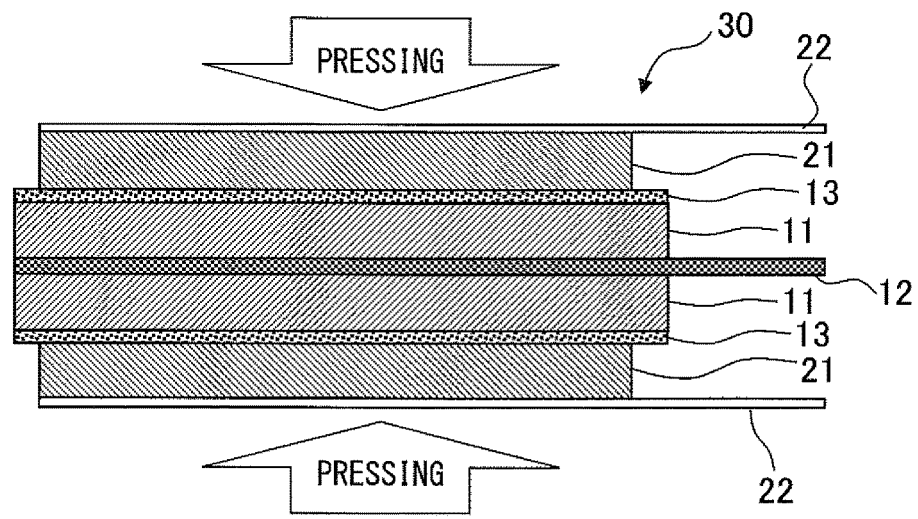
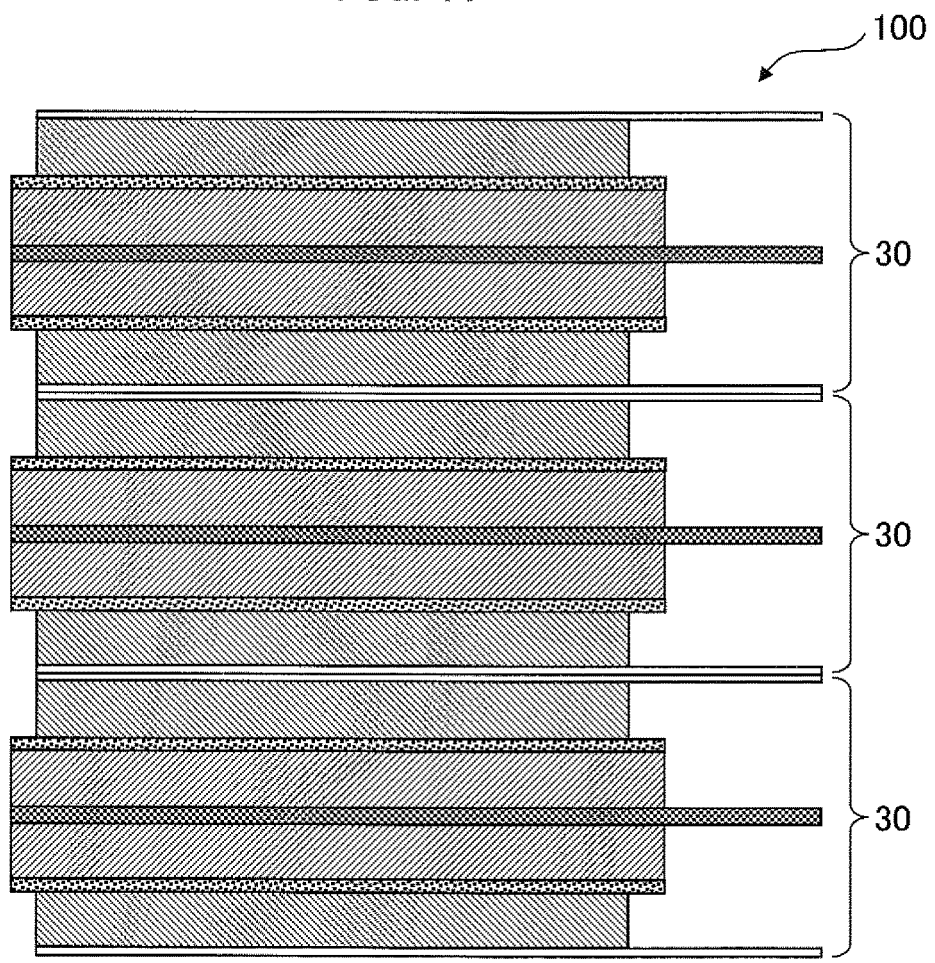

METHOD FOR PRODUCING ALL-SOLID-STATE BATTERY, AND ALL-SOLID-STATE BATTERY

TECHNICAL FIELD

The present invention relates to a method for producing an all-solid-state battery, and to an all-solid-state battery.

BACKGROUND ART

In recent years, secondary batteries have become important components that are essential as power sources for personal computers, video cameras, cellular phones and the like, or as power sources for automobiles and electric power storage.

Among secondary batteries, lithium ion secondary batteries in particular have the feature of higher capacity density than other secondary batteries, and the ability to operate at high voltage. They are therefore used in data-related devices and communication devices as secondary batteries that are suitable for size and weight reduction, and development has been progressing in recent years toward lithium ion secondary batteries with high output and high capacity, for electric vehicles or hybrid vehicles that constitute lower public hazards.

Lithium ion secondary batteries or lithium secondary batteries comprise a positive electrode layer and negative electrode layer, with an electrolyte comprising a lithium salt situated between them, where the electrolyte is composed of a nonaqueous liquid or solid. When a nonaqueous liquid electrolyte is used as the electrolyte, the electrolyte solution permeates into the positive electrode layer, readily forming an interface between the positive electrode active material of the positive electrode layer and the electrolyte, so that performance is easily improved. However, since the electrolyte solutions that are in wide use are combustible, it becomes necessary to install safety equipment to minimize temperature increase during short circuiting, or to mount a system for ensuring safety, such as preventing short circuiting. On the other hand, all-solid-state batteries, wherein the liquid electrolyte is replaced with a solid electrolyte to render the entire battery solid, do not employ combustible organic solvents in the batteries and thus allow safety equipment to be simplified and are considered to be superior in terms of production cost and productivity, and their development is also progressing.

As all-solid-state batteries there have been proposed all-solid-state batteries comprising a positive electrode collector/positive electrode active material layer/solid electrolyte layer/negative electrode active material layer/negative electrode collector, and a method for producing them has been also been proposed, by combining a positive electrode collector/positive electrode active material layer/solid electrolyte layer and pressing them to form a stack, or pressing a positive electrode collector/positive electrode active material layer/solid electrolyte layer/negative electrode active material layer/negative electrode collector to form a stack (PTL 1).

CITATION LIST

Patent Literature

[PTL 1] International Patent Publication No. WO2012/077197(A1)

SUMMARY OF THE INVENTION

Problems to be Solved by the Invention

However, when a positive electrode collector/positive electrode active material layer/solid electrolyte layer are combined and pressed, or a positive electrode collector/positive electrode active material layer/solid electrolyte layer/negative electrode active material layer/negative electrode collector are combined and pressed, as described in PTL 1, warping has taken place in the pressed stack. In such cases it is necessary to carry out a step of minimizing warping of the stack, and this creates a problem of an increased number of steps for production of the all-solid-state battery. A need therefore exists for a method for producing an all-solid-state battery that can reduce the steps for minimizing warping, compared to the prior art.

Means for Solving the Problems

The present invention relates to a method for producing an all-solid-state battery, comprising the steps of:

(A) disposing a first electrode active material layer containing a first electrode active material on both sides of a first collector having a first main surface and a second main surface, to form a first electrode layer, (B) disposing a solid electrolyte layer containing a solid electrolyte on each of the first electrode active material layers disposed on both sides, (C) disposing a second electrode active material layer containing a second electrode active material, and a second collector, on the solid electrolyte layers disposed on each of the first electrode active material layers, in such a manner that the second electrode active material layer contacts with each solid electrolyte layer, (D) pressing a stack comprising the second collector, second electrode active material layer, solid electrolyte layer, first electrode active material layer, first collector, first electrode active material layer, solid electrolyte layer, second electrode active material layer and second collector, formed in steps (A) to (C), to form a battery unit, (E) repeating steps (A) to (D) to form a plurality of battery units, and (F) stacking the plurality of battery units.

The invention further relates to an all-solid-state battery comprising two or more battery units each having a second collector, second electrode active material layer, solid electrolyte layer, first electrode active material layer, first collector, first electrode active material layer, solid electrolyte layer, second electrode active material layer and second collector stacked in that order, wherein the two or more battery units are stacked with the second collectors in mutual contact.

Effect of the Invention

According to the invention it is possible to provide a method for producing an all-solid-state battery with fewer steps for minimizing warping than in the prior art, and an all-solid-state battery with lower warping.

BRIEF DESCRIPTION OF THE DRAWINGS

FIG. 8 is a top schematic view of a stack with an anchored positive electrode layer.

FIG. 9 is a top schematic view of a pressed stack, showing the cutting sections as dashed lines.

FIG. 16 is a cross-sectional schematic view of a battery unit 30 produced by pressing a stack.

FIG. 17 is a cross-sectional schematic view of an all-solid-state battery produced by stacking a plurality of battery units.

DESCRIPTION OF EMBODIMENTS

Figure 1:
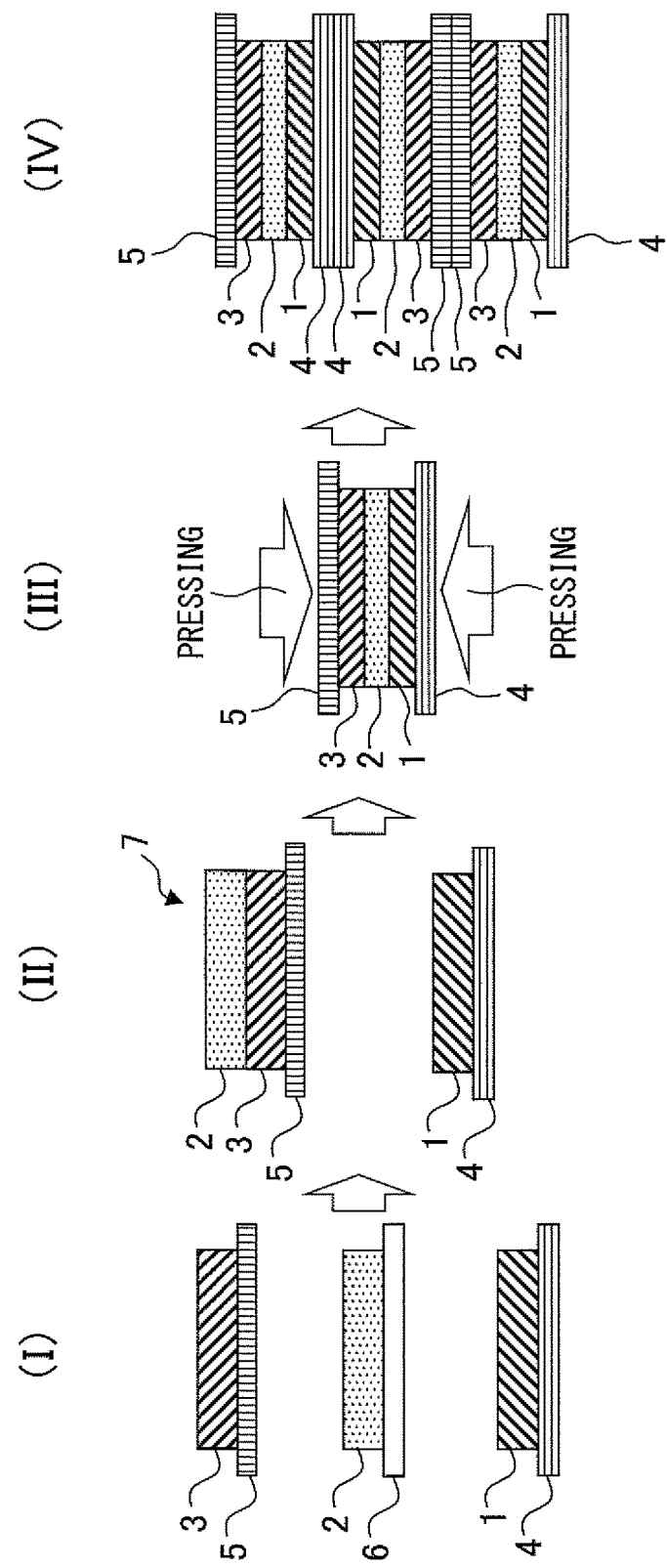
FIG. 1 is a cross-sectional schematic drawing for explanation of a method of producing an all-solid-state battery of the prior art.

In the prior art, all-solid-state batteries have been produced by the process illustrated in FIG. 1. FIG. 1 is a cross-sectional schematic drawing for explanation of a method of producing an all-solid-state battery of the prior art. First, in step (I) of FIG. 1, there are prepared a positive electrode active material layer 1 formed on a positive electrode collector 4, a solid electrolyte layer 2 formed on a substrate 6 and a negative electrode active material layer 3 formed on a negative electrode collector 5.

Next, in step (II), the solid electrolyte layer 2 is transferred onto the negative electrode active material layer 3. In step (III), the positive electrode active material layer 1 formed on the positive electrode collector 4 and the solid electrolyte layer 2 are then stacked and pressed, to produce a battery unit comprising a negative electrode collector layer, negative electrode active material layer, solid electrolyte layer, positive electrode active material layer and positive electrode collector layer.

A plurality of battery units are produced in the same manner, and in step (IV), they are stacked with the positive electrode collectors and negative electrode collectors in contact with each other, to produce an all-solid-state battery. Step (IV) shows an example where three battery units are stacked.

Figure 2:
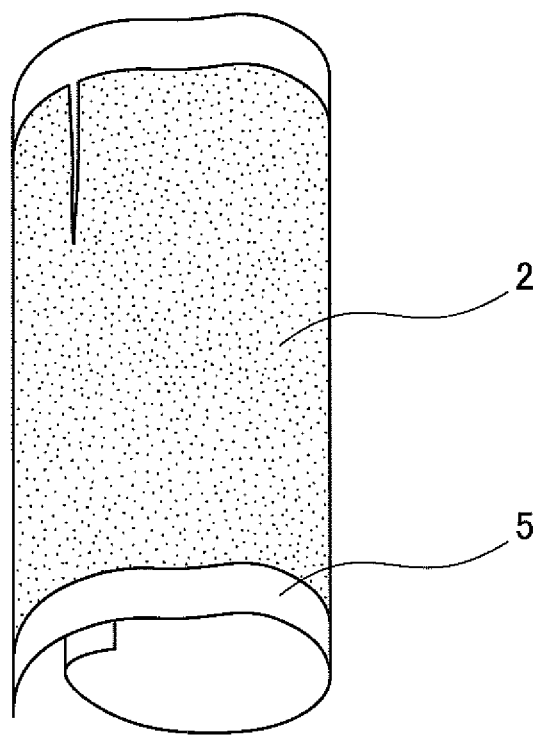
FIG. 2 is an external view of a warped stack, after a solid electrolyte layer has been transferred onto the negative electrode active material layer of the stack comprising a negative electrode collector and a negative electrode active material layer.

Since transfer is performed by pressing when the solid electrolyte layer 2 is transferred onto the negative electrode active material layer 3 in step (II), stress is generated in the stack 7 comprising the negative electrode collector 5, negative electrode active material layer 3 and solid electrolyte layer 2, and this can cause warping of the stack 7, as shown in FIG. 2.

FIG. 2 is an external view of a warped stack comprising a negative electrode collector, negative electrode active material layer and solid electrolyte layer, after the solid electrolyte layer has been transferred onto the negative electrode active material layer of the stack comprising the negative electrode collector and the negative electrode active material layer. High warping of the stack 7 also leads to crack in the negative electrode active material layer and solid electrolyte layer.

When the stack 7 warps in this way, it becomes impossible to perform stacking of the positive electrode active material layer 1 and positive electrode collector 4 in the subsequent steps, and a battery unit can no longer be produced.

Such warping of a stack in the production steps for an all-solid-state battery is most notable when the solid electrolyte layer is transferred to the negative electrode active material layer situated on one side of the negative electrode collector. Warping can still easily occur in the battery unit due to asymmetry of the battery unit structure even when the solid electrolyte layer is placed on the negative electrode active material layer by coating or the like, and the positive electrode active material layer and positive electrode collector are placed and the stack is pressed. When an all-solid-state battery is produced by stacking a plurality of battery units, a larger number of battery unit stacks increases the effect of warping.

Thus, in the conventional steps for producing an all-solid-state battery, warping of the stacks and battery units has been a problem requiring steps for minimizing warping. Steps for minimizing warping that are carried out in the prior art include the following procedures.

Figure 3:
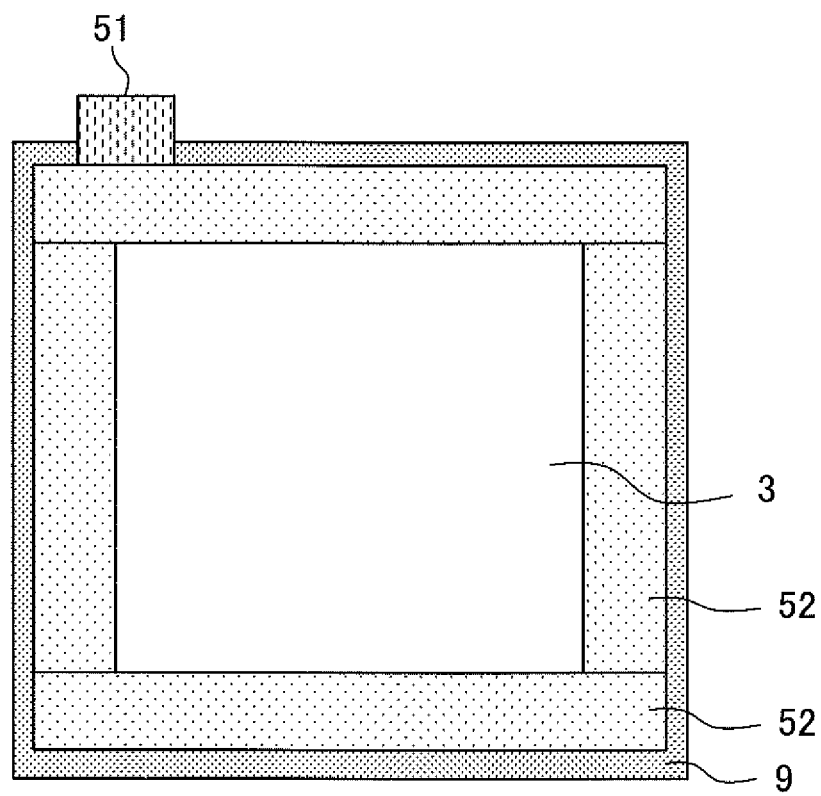
FIG. 3 is a top schematic view of a stack with an anchored negative electrode layer.
Figure 4:
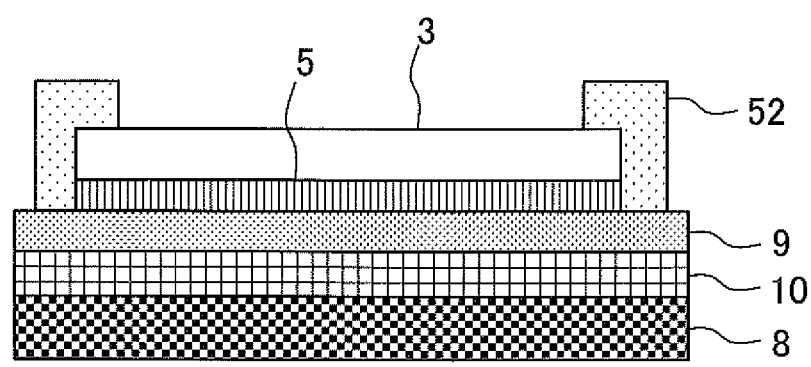
FIG. 4 is a cross-sectional schematic view of a stack with an anchored negative electrode layer.

First, as shown in FIG. 3 and FIG. 4, a resin-coated aluminum laminate 10 is placed on a rigid aluminum sheet 8, and the four sides of the aluminum laminate 10 are anchored to the aluminum sheet 8 with tape. A negative electrode layer comprising a negative electrode collector 5 with a negative electrode collector tab 51, and a negative electrode active material layer 3, are then placed on the resin coating 9 of the aluminum laminate 10, and the four sides of the negative electrode layer are anchored to the resin coating 9 of the aluminum laminate with transparent tape 52, to produce a stack. An aluminum laminate 10 with a resin coating 9 is used in order to avoid short circuiting between the positive electrode layer and the negative electrode layer in the steps for producing the battery. FIG. 3 is a top schematic view of a stack with an anchored negative electrode layer, and FIG. 4 is a cross-sectional schematic view of a stack with an anchored negative electrode layer. The tape-attachment procedure takes approximately 15 minutes for each unit, and for example, about 300 minutes are necessary for production of 20 units.

Figure 5:
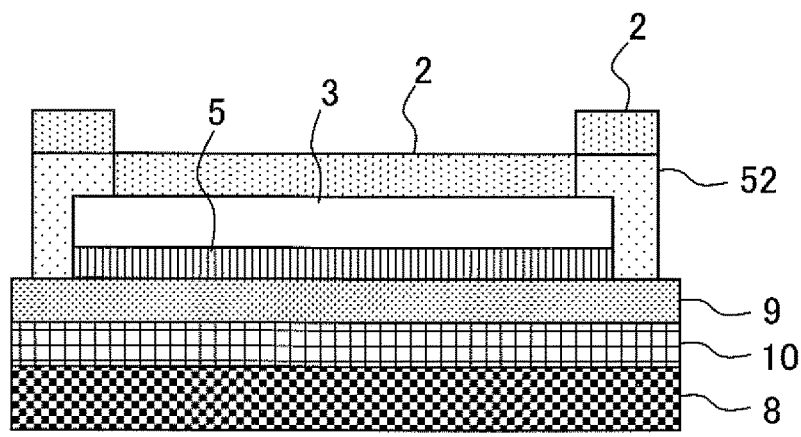
FIG. 5 is a cross-sectional schematic view of a stack after transfer of a solid electrolyte layer.
Figure 6:
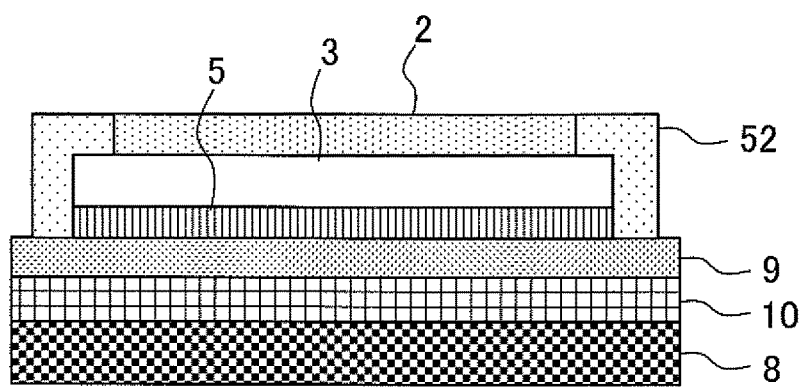
FIG. 6 is a cross-sectional schematic view of a stack after the solid electrolyte layer on the transparent tape 52 has been peeled off.

Next, as shown in FIG. 5, the solid electrolyte layer 2 is transferred onto the anchored negative electrode active material layer 3. As the solid electrolyte 2 is also transferred onto the transparent tape 52 at this time, the solid electrolyte layer 2 is peeled off from the transparent tape 52, as shown in FIG. 6. FIG. 5 is a cross-sectional schematic view of a stack after the solid electrolyte layer 2 has been transferred, and FIG. 6 is a cross-sectional schematic view of a stack after the solid electrolyte layer on the transparent tape 52 has been peeled off. The procedure for peeling off the solid electrolyte layer requires about 10 minutes per unit, and for example, about 200 minutes are necessary for production of 20 units.

Figure 7:
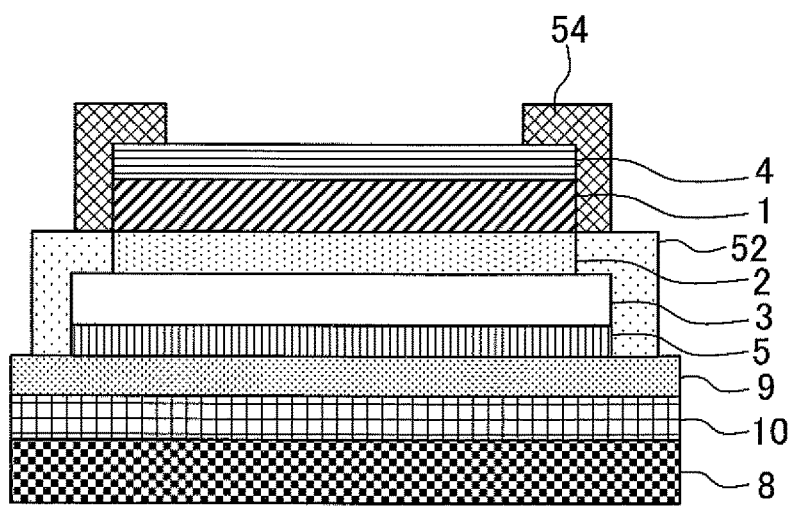
FIG. 7 is a cross-sectional schematic view of a stack with an anchored positive electrode layer.

Next, as shown in FIG. 7 and FIG. 8, a positive electrode layer comprising a positive electrode active material layer 1 and a positive electrode collector 4 with a positive electrode collector tab 53 is stacked, and the side with the positive electrode collector tab 53 of the positive electrode layer is anchored with transparent tape 54 and pressed. FIG. 7 is a cross-sectional schematic view of a stack with an anchored positive electrode layer, and FIG. 8 is a top schematic view of a stack with an anchored positive electrode layer. After pressing, the transparent tape 54 is peeled off.

Figure 10:
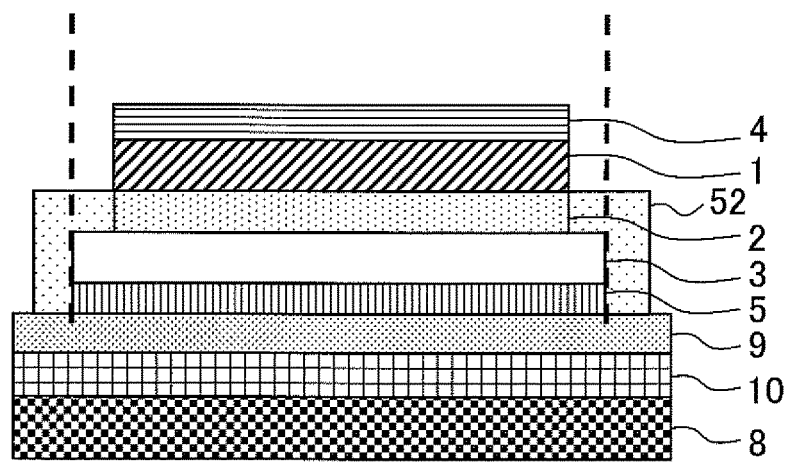
FIG. 10 is a cross-sectional schematic view of a pressed stack, showing the cutting sections as dashed lines.

In order to produce an all-solid-state battery by stacking battery units formed in this manner, the battery units are separated from the aluminum laminates 10 with the resin coatings 9. As shown in FIG. 9 and FIG. 10, transparent tape 52 is cut along the dashed lines, following the outer shape of the negative electrode collector 5 and negative electrode collector tab 51. FIG. 9 is a top schematic view showing the cutting sections of the pressed stack as dashed lines, and FIG. 10 is a cross-sectional schematic view showing the cutting sections of the pressed stack as dashed lines.

The transparent tape 52 is cut from the side with the positive electrode collector tab 53, turning up the positive electrode collector tab 53 so as not to damage the positive electrode collector tab 53. The battery unit is then separated from the aluminum laminate 10 with the resin coating 9. The procedure for separation of the battery unit takes about 10 minutes for each unit, and for example, about 200 minutes are necessary for production of 20 units.

Thus, numerous steps have been necessary for production of an all-solid-state battery having reduced warping of the stack. For example, when an all-solid-state battery having 20 stacked layers of battery units is produced, in order to minimize warping of the stack, 300 minutes are necessary for the tape attachment procedure, 200 minutes are necessary for the solid electrolyte layer peeling procedure and 200 minutes are necessary for the battery separation procedure, for a total of 700 minutes. Even if the battery unit is produced through such a large number of steps, some warping of the battery units takes place due to asymmetry of the battery units. When an all-solid-state battery is produced by stacking, for example, 10 or more, 20 or more, 50 or more or 100 or more battery units, it becomes impossible to ignore the effect of warping of the battery units as the number of stacked layers increases, and this has led to the problem of proneness of the stack to shifting.

The present inventor has conducted diligent research on methods for producing all-solid-state batteries in light of this problem, and have discovered a method for producing an all-solid-state battery that can reduce the number of steps required to minimize warping.

The invention relates to a method for producing an all-solid-state battery, comprising the steps of (A) disposing a first electrode active material layer containing a first electrode active material on both sides of a first collector having a first main surface and a second main surface, to form first electrode layers, (B) disposing a solid electrolyte layer containing a solid electrolyte on each of the first electrode active material layers disposed on both sides, (C) disposing a second electrode active material layer containing a second electrode active material, and a second collector, on the solid electrolyte layers disposed on each of the first electrode active material layers, in such a manner that the second electrode active material layers contact with the solid electrolyte layers, (D) pressing a stack comprising the second collector, second electrode active material layer, solid electrolyte layer, first electrode active material layer, first collector, first electrode active material layer, solid electrolyte layer, second electrode active material layer and second collector, formed in steps (A) to (C), to form a battery unit, (E) repeating steps (A) to (D) to form a plurality of battery units, and (F) stacking the plurality of battery units.

According to the invention, warping of a stack comprising a collector, electrode active material layer and solid electrolyte layer in production of an all-solid-state battery is minimized, and it is possible to eliminate steps for minimizing warping of the stack that have been necessary in the prior art.

Since the invention can substantially inhibit warping that may occur in stacks in the prior art, it is possible to eliminate the tape attachment procedure described above (anchoring procedure). As a result, it is possible to eliminate the procedures of peeling off the solid electrolyte layer and separating the battery units. Since the invention thus makes it possible to significantly reduce the number of steps, the time required for the production process for an all-solid-state battery can be reduced to, for example, about ¼ when producing an all-solid-state battery having 20 stacked battery units.

According to the invention it is also possible to obtain an all-solid-state battery with high energy density. By producing an all-solid-state battery by the method of the invention it is possible to reduce the overall volume percentage occupied by the first collector in the all-solid-state battery compared to the prior art, and therefore to improve the energy density per unit volume and reduce the all-solid-state battery size, compared to an all-solid-state battery of the prior art.

The production method of the invention will now be explained with reference to the accompanying drawings.

Figure 11:
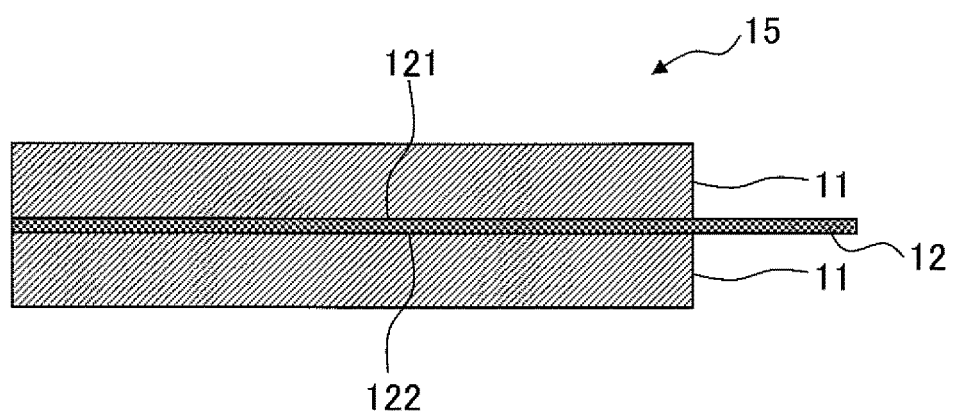
FIG. 11 is a cross-sectional schematic view of a stack comprising a first collector and first electrode active material layers.

Step (A) according to the invention comprises disposing a first electrode active material layer 11 containing a first electrode active material on both sides of a first collector 12 having a first main surface 121 and a second main surface 122, to form a first electrode layer 15, as shown in FIG. 11. FIG. 11 is a cross-sectional schematic view of a stack comprising a first collector 12 and first electrode active material layers 11.

The thickness of the first electrode active material layers 11 disposed on both the first main surface 121 and the second main surface 122 of the first collector 12 may be determined according to the characteristics desired for the battery. For example, the first electrode active material layer 11 has a thickness such that it has preferably 1 to 1000 μm and more preferably 5 to 200 μm after consolidation by pressing. Also, the first electrode active material layers 11 disposed on the first main surface and the second main surface preferably have substantially the same thickness. More specifically, the difference in the thicknesses of the first electrode active material layers 11 when they are disposed on the first main surface and the second main surface is preferably within 20%, more preferably within 10%, even more preferably within 5%, yet more preferably within 1% and even yet more preferably substantially 0%, of the thickness of the first electrode active material layer 11 disposed on the first main surface. If the first electrode active material layers 11 disposed on both sides have substantially the same thickness, it will be possible to reduce or eliminate warping of the stack comprising the first collector 12 and the first electrode active material layers 11. The solid electrolyte layers, second electrode active material layers and second collectors formed on both sides as described hereunder all preferably have substantially the same thickness.

The first electrode active material layers 11 each contain a first electrode active material, and optionally also contain a solid electrolyte, a conductive aid and a binder.

The first electrode active material used may be any material that can be used as an electrode active material for an all-solid-state battery. Examples of active materials include lithium cobaltate ($LiCoO_2$), lithium nickelate ($LiNiO_2$), lithium manganate ($LiMn_2O_4$), $LiCo_{1/3}Ni_{1/3}Mn_{1/3}O_2$, hetero-element-substituted Li—Mn spinel having a composition represented by $Li_{1+x}Mn_{2-x-y}M_yO_4$ (where M is one or more metal elements selected from Al, Mg, Co, Fe, Ni and Zn), lithium titanate ($Li_xTiO_y$), lithium metal phosphates ($LiMPO_4$, where M is Fe, Mn, Co or Ni), transition metal oxides, such as vanadium oxide ($V_2O_5$) and molybdenum oxide ($MoO_3$), titanium sulfide ($TiS_2$), carbon materials, such as graphite and hard carbon, lithium cobalt nitride (LiCoN), lithium silicon oxides ($Li_xSi_yO_z$), lithium metal (Li), lithium alloys (TAM, where M is Sn, Si, Al, Ge, Sb or P), lithium storage intermetallic compounds (MgxM or NySb, where M is Sn, Ge or Sb and N is In, Cu or Mn), and derivatives of the foregoing.

In the invention, there is no clear distinction between positive electrode active materials and negative electrode active materials, and a battery with the desired voltage can be constructed by comparing the two different charge-discharge potentials and using the one exhibiting an electropositive charge-discharge potential as the positive electrode active material layer and the one exhibiting an electronegative charge-discharge potential as the negative electrode active material layer.

In the invention, the first electrode active material layer and the second electrode active material layer may be a positive electrode active material layer and negative electrode active material layer, and the electrode active material layer of the first electrode active material layer or second electrode active material layer may be a positive electrode active material layer or negative electrode active material layer.

The solid electrolyte material used in the first electrode active material layers 11 may be a material that can be utilized as a solid electrolyte for all-solid-state batteries. Examples of solid electrolyte materials include sulfide-based amorphous solid electrolytes, such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and $Li_2S$—$P_2S_5$, oxide-based amorphous solid electrolytes, such as $Li_2O$—$B_2O_3$—$P_2O_5$, $Li_2O$—$SiO_2$, $Li_2O$—$B_2O_3$ and $Li_2O$—$B_2O_3$—$ZnO$, crystalline oxides, such as $Li_{1.3}Al_{0.3}Ti_{0.7}(PO_4)_3$, $Li_{1+x+y}AxTi_{2-x}Si_yP_{3-y}O_{12}$ (A is Al or Ga, $0 \leq x \leq 0.4$, $0 < y \leq 0.6$), $[(B_{1/2}Li_{1/2})_{1-z}C_z]TiO_3$ (B is La, Pr, Nd or Sm, C is Sr or Ba, $0 \leq z \leq 0.5$), $Li_5La_3Ta_2O_{12}$, $Li_7La_3Zr_2O_{12}$, $Li_6BaLa_2Ta_2O_{12}$ and $Li_{3.6}Si_{0.6}P_{0.4}O_4$, crystalline oxynitrides, such as $Li_3PO_{(4-3/2w)}N_w$ (w<1), and LiI, $LiI$—$Al_2O_3$, $Li_3N$, $Li_3N$—$LiI$—$LiOH$ and the like. Sulfide-based amorphous solid electrolytes are preferably used from the viewpoint of their excellent lithium ion conductivity. The solid electrolyte used for the invention may be a semi-solid polymer electrolyte, such as polyethylene oxide, polypropylene oxide, polyvinylidene fluoride or polyacrylonitrile, containing a lithium salt.

When the first electrode active material layers 11 comprise a solid electrolyte, the blending ratio of the electrode active material and the solid electrolyte is not particularly restricted but the electrode active material:solid electrolyte volume ratio is preferably 40:60 to 90:10.

When the first electrode active material layer is a positive electrode active material layer and contains a sulfide solid electrolyte, the positive electrode active material is preferably covered with an ionic conductive oxide, from the viewpoint of inhibiting formation of a high resistance layer at the interface between the positive electrode active material and the sulfide solid electrolyte, to help prevent increase in battery resistance. Examples of lithium ion conducting oxides to cover the positive electrode active material include oxides represented by the general formula LixAOy (where A is B, C, Al, Si, P, S, Ti, Zr, Nb, Mo, Ta or W, and x and y are positive integers). Specific examples include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. The lithium ion conducting oxide may also be a complex oxide.

A complex oxide covering the positive electrode active material may be any combination of the aforementioned lithium ion conducting oxides, examples of which include $Li_4SiO_4$—$Li_3BO_3$ and $Li_4SiO_4$—$Li_3PO_4$.

When the surface of the positive electrode active material is covered with an ionic conductive oxide, it is sufficient if the ionic conductive oxide covers at least part of the positive electrode active material, although it may also cover the entire surface of the positive electrode active material. The thickness of the ionic conductive oxide covering the positive electrode active material is preferably 0.1 nm or more and 100 nm or less, and more preferably 1 nm or more and 20 nm or less, for example. The thickness of the ionic conductive oxide can be measured by using a transmission electron microscope (TEM), for example.

Materials for the binder to be included in the first electrode active material layer 11 are not particularly restricted, and there may be used polytetrafluoroethylene, polybutadiene rubber, hydrogenated butylene rubber, styrene-butadiene rubber, polysulfide rubber, polyvinyl fluoride, polyvinylidene fluoride and the like.

Materials for the conductive aid to be included in the first electrode active material layer 11 are also not particularly restricted, and there may be used graphite, carbon black and the like.

Materials for the first collector 12 are not particularly restricted so long as they are conductive and function as a positive electrode collector or negative electrode collector.

Examples of positive electrode collectors include SUS, aluminum, copper, nickel, iron, titanium and carbon, with SUS and aluminum being preferred. Also, the positive electrode collector may be, for example, in the form of a foil, sheet or mesh, with a foil being preferred.

Examples of negative electrode collectors include SUS, copper, nickel and carbon, with SUS and copper being preferred. The negative electrode collector may be, for example, in the form of a foil, sheet or mesh, with a foil being preferred.

The thickness of the first collector 12 is not particularly restricted, and for example, a metal foil with a thickness of about 10 to 500 μm may be used.

In step (A), disposing of the first electrode active material layers 11 on both sides of the first collector 12 may be performed by a slurry coating process, blasting, aerosol deposition, cold spraying, sputtering, vapor growth, thermal spraying or the like, with slurry coating being preferred since it allows an electrode active material layer to be obtained by a simple process.

A slurry coating process can be carried out by preparing a slurry containing the first electrode active material, and then coating and drying the prepared slurry onto both sides of the first main surface and second main surface of the first collector.

The slurry containing the first electrode active material may be prepared either in step (A) or before step (A).

The slurry containing the first electrode active material may be coated and dried onto one of the sides, of the first main surface and second main surface of the first collector, and then coated and dried onto the other side, it may be coated and dried simultaneously on both sides of the first collector, or it may be coated onto one side of the first collector and then coated onto the other side, and the coated films on both sides are simultaneously dried. At this stage, little stress is produced in the stack comprising the first collector and first electrode active material layer and the problem of warping of the stack substantially does not arise, but preferably the slurry is coated and dried simultaneously onto both sides of the first collector.

When it is coated and dried onto one of the sides of the first main surface and second main surface of the first collector and then coated and dried onto the other side, a slurry comprising the first electrode active material may be coated and dried onto the first main surface by, for example, doctor blading, and then a slurry comprising the first electrode active material may be coated and dried onto the second main surface.

When a slurry comprising the first electrode active material is coated and dried simultaneously onto both the first main surface and the second main surface of the first collector, for example, the first collector may be dipped in a dam housing the slurry comprising the first electrode active material and the first collector may be lifted out and dried at a prescribed speed and temperature to form a first electrode active material layer on both sides of the first collector. The lifting speed and drying temperature may be selected according to the thickness desired for the first electrode active material layer.

Alternatively, disposing of the first electrode active material layer 11 on both sides of the first collector 12 in step (A) may be performed by preparing a substrate, coating and drying a slurry comprising the first electrode active material onto the substrate to form a first electrode active material film, and transferring the first electrode active material film formed on the substrate onto both the first main surface and second main surface of the first collector.

When the first electrode active material films are transferred onto both the first main surface and second main surface of the first collector 12, the first electrode active material films are transferred simultaneously onto both sides of the first collector 12 to form the first electrode active material layers 11. This can minimize warping of the stack comprising the first collector 12 and the first electrode active material layers 11.

The pressure for pressing during transfer may be any desired pressure that allows transfer of the first electrode active material film onto the first collector 12, and it is preferably 50 to 1000 MPa and more preferably 80 to 600 MPa. The holding time for pressing for transfer may also be any desired time that allows transfer of the first electrode active material film onto the first collector 12, and it is preferably 10 seconds to 5 minutes and more preferably 30 seconds to 2 minutes.

When the first electrode active material layer is disposed by transfer, the substrate for formation of the first electrode active material film is not particularly restricted, and it may be the current collector foil to be used as the collector, or a film-like substrate with flexibility, a hard substrate, or the like, and for example, it may be a substrate, such as an aluminum foil, copper foil or SUS foil, or a polyethylene terephthalate (PET) film or TEFLON®. The substrate used is preferably a substrate having film-like flexibility, with a release agent coated onto the surface, and more preferably, it is an aluminum foil, copper foil, SUS foil or polyethylene terephthalate (PET) film having a release agent coated on the surface.

The coating process for the slurry comprising the first electrode active material onto the first collector or substrate may be dam-type slurry coating, doctor blading, gravure transfer, reverse roll coating, die coating or the like.

The slurry comprising the first electrode active material can be prepared by mixing the first electrode active material and a solvent, and optionally a solid electrolyte, conductive aid and binder, by a method known in the prior art.

The solvent used to prepare the slurry is not particularly restricted so long as it does not adversely affect the performance of the first electrode active material. Examples of the solvents include hydrocarbon-based organic solvents, such as heptane, toluene and hexane, and hydrocarbon-based organic solvents with reduced moisture contents obtained by dehydrating treatment are preferably used. Solid electrolytes, conductive aids and binders to be included in the slurry comprising the first electrode active material may be the aforementioned materials that may be included in the first electrode active material layer.

Figure 12:
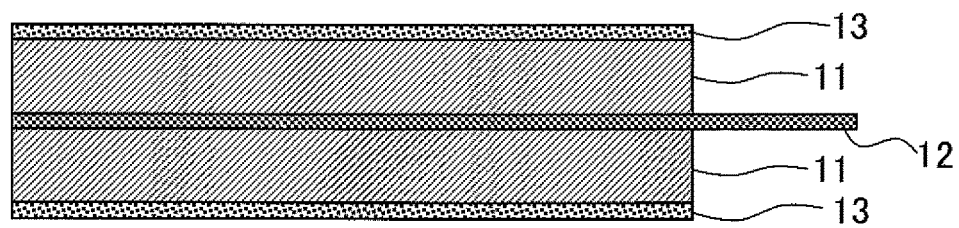
FIG. 12 is a cross-sectional schematic view of a stack after disposing solid electrolyte layers.

Step (B) according to the invention comprises disposing a solid electrolyte layer 13 comprising a solid electrolyte onto each first electrode active material layer 11 that has been disposed on both sides of the first collector 12, as shown in FIG. 12. FIG. 12 is a cross-sectional schematic view of a stack after disposing solid electrolyte layers 13.

The thickness of the solid electrolyte layer 13 may be selected according to the desired battery characteristics. For example, the solid electrolyte layer 13 has a thickness such that it has preferably 0.1 to 1000 µm, more preferably 1 to 100 µm and even more preferably 10 to 50 µm after consolidation by pressing. The thickness of the solid electrolyte layer 13 is preferably as thin as possible within a range that can minimize short circuiting between the first electrode active material layer 11 and the second electrode active material layer 21.

The solid electrolyte layer 13 comprises a solid electrolyte, and may also optionally comprise a binder. The solid electrolyte material used may be a solid electrolyte material that can be included in the first electrode active material layer 11. When the first electrode active material layer 11 contains a solid electrolyte, the solid electrolyte in the first electrode active material layer 11 is preferably the same material as the solid electrolyte in the solid electrolyte layer 13. The binder material used may be a binder material that can be included in the first electrode active material layer 11.

According to the invention, step (B) preferably includes transferring the solid electrolyte film formed on the substrate, onto each first electrode active material layer 11 disposed on both sides.

By disposing solid electrolyte layers 13 by transfer of solid electrolyte films onto the first electrode active material layers 11, it is possible to form dense solid electrolyte layers 13 that can further prevent short circuiting between the positive electrode layer and negative electrode layer. The solid electrolyte layer 13 may be directly coated onto each first electrode active material layer 11. However, it is relatively difficult to obtain a solid electrolyte layer that is thin and has a uniform thickness since relatively large irregularities may be present on the surface of the first electrode active material layer 11. When the solid electrolyte layer 13 is formed by direct coating onto each first electrode active material layer 11, consolidation of the solid electrolyte layer 13 will be necessary at some later step, and pressing is necessary preferably before disposing the second electrode active material layer. When the solid electrolyte layer 13 is disposed by transfer of a solid electrolyte film onto each first electrode active material layer 11, it is relatively easy to obtain a dense solid electrolyte layer having low and uniform thickness.

The solid electrolyte films formed on the substrates can be prepared by providing substrates, preparing a slurry containing the solid electrolyte, and coating and drying the prepared slurry onto the substrates to form solid electrolyte films comprising the solid electrolyte. Providing the substrates, preparing the slurry comprising the solid electrolyte and coating and drying the slurry onto the substrates to form solid electrolyte films comprising the solid electrolyte may be carried out in step (B), or they may be carried out before step (B).

The substrate on which the solid electrolyte is to be formed is not particularly restricted, and it is possible to use the substrate described above that is used for coating of the slurry comprising the first electrode active material.

The slurry comprising the solid electrolyte can be prepared by mixing the solid electrolyte and a solvent, and optionally a binder, by a method known in the prior art.

The solid electrolyte materials mentioned above may be used as solid electrolyte materials to be included in the slurry comprising the solid electrolyte. The solvent used to prepare the slurry comprising the solid electrolyte is not particularly restricted so long as it does not adversely affect the performance of the solid electrolyte, and for example, the solvent used may be one that can be used for preparation of the slurry comprising the first electrode active material, mentioned above. Binders that may be included in the slurry comprising the solid electrolyte may also be the same binders to be used for preparation of the slurry comprising the first electrode active material, mentioned above.

The coating process for the slurry comprising the solid electrolyte onto the substrate may be dam-type slurry coating, doctor blading, gravure transfer, reverse roll coating, die coating or the like.

Transfer of the solid electrolyte film onto the first electrode active material layer 11 can be performed by stacking and pressing in such a manner that the solid electrolyte film formed on the substrate and the first electrode active material layer 11 disposed on both sides are in contact.

When the solid electrolyte layer is formed by transfer, the solid electrolyte film is simultaneously transferred onto each of the first electrode active material layers 11 disposed on both sides. This can minimize warping of the stack after transfer.

When the solid electrolyte film is transferred onto one of the first electrode active material layers 11 that are formed on both sides, stress is produced in the stack comprising the first collector 12, the first electrode active material layers 11 and the solid electrolyte layers 13, tending to create warping in the stack.

Without being constrained by theory, it is believed that when the solid electrolyte film is transferred onto only one of the first electrode active material layers 11, stress is applied onto the stack comprising the first collector, first electrode active material layers and solid electrolyte layers, and since different degrees of contractive force are generated between the collector layer, electrode active material layers and solid electrolyte layers after transfer, warping is produced in the stack. Presumably, by simultaneously transferring solid electrolyte films onto each of the first electrode active material layers 11 disposed on both sides to form the solid electrolyte layers 13, it is possible to cancel out the generated stress and thus minimize warping of the stack.

The method for transferring the solid electrolyte films may be carried out by using a commercially available press molding apparatus, and it may be a method, such as uniaxial pressing, cold isostatic pressing (CTP) or hot pressing.

Figure 13:
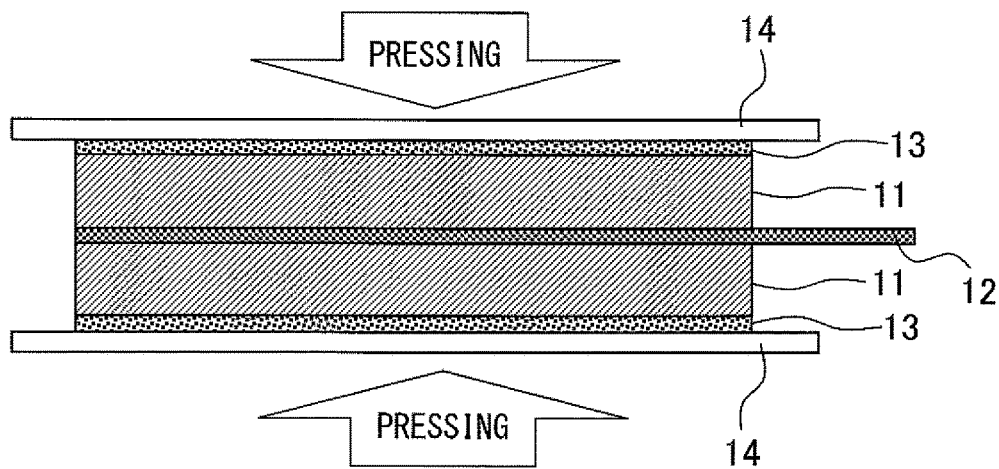
FIG. 13 is a cross-sectional schematic view of a stack wherein solid electrolyte films are being transferred.

A preferred embodiment for the method of transfer of the solid electrolyte films is uniaxial pressing, as illustrated in FIG. 13. FIG. 13 is a cross-sectional schematic view of a stack wherein solid electrolyte films are being transferred. Uniaxial pressing allows pressure application in a relatively short period of time, and is industrially advantageous. Solid electrolyte layers 13 formed on substrates 14 are layered onto the stack comprising the first electrode active material layer 11, first collector 12 and first electrode active material layer 11 so that the stack is sandwiched between the solid electrolyte layers 13, and metal sheets may be contacted with substrates 14 positioned above and below the stack, for pressing of the stack in the direction perpendicular to the stacking surface.

The pressure during transfer may be any desired pressure that allows transfer of the solid electrolyte films onto the first electrode active material layers 11, and it is preferably 50 to 1000 MPa and more preferably 80 to 600 MPa. The holding time for pressing for transfer may also be any desired time that allows transfer of the solid electrolyte films onto the first electrode active material layers 11, and it is preferably 10 seconds to 5 minutes and more preferably 30 seconds to 2 minutes.

Another preferred embodiment for the method of transferring the solid electrolyte films is cold isostatic pressing (CIP), which allows isotropic pressing to be performed. The solid electrolyte layers 13 formed on substrates 14 may be layered onto the stack comprising the first electrode active material layer 11, first collector 12 and first electrode active material layer 11 so that the stack is sandwiched with the solid electrolyte layers 13, and the stack may be placed in a packaging material, such as a laminate, subjected to vacuum suctioning, and then subjected to press molding by cold isostatic pressing (CIP).

The pressing pressure for cold isostatic pressing may be any desired pressure that allows transfer of the solid electrolyte films onto the first electrode active material layers 11, and it is preferably 300 to 1500 MPa and more preferably 500 to 1000 MPa. The holding time for the pressing pressure for cold isostatic pressing may also be any desired time that allows transfer of the solid electrolyte films onto the first electrode active material layers 11, and it is preferably 10 seconds to 5 minutes and more preferably 30 seconds to 2 minutes.

Figure 14:
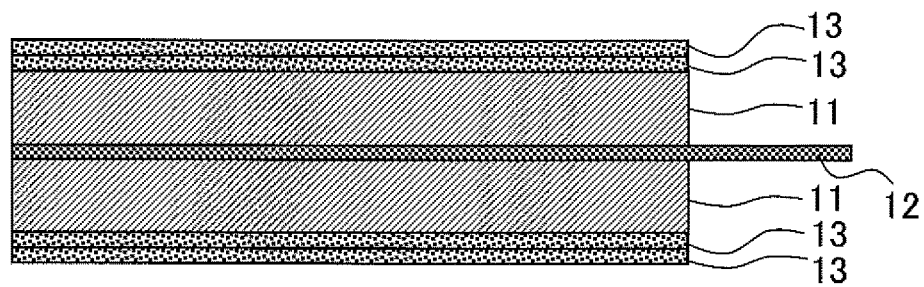
FIG. 14 is a cross-sectional schematic view of a stack after disposing two solid electrolyte layers on each side.

As shown in FIG. 14, preferably two solid electrolyte layers 13 are disposed on both sides each, whether they are disposed by transfer or coating. FIG. 14 is a cross-sectional schematic view of a stack after disposing two solid electrolyte layers 13 on each side. By disposing two solid electrolyte layers on each side, it is possible to prevent short circuiting between the positive electrode and negative electrode even when pinholes or voids are generated in the solid electrolyte layers.

Figure 15:
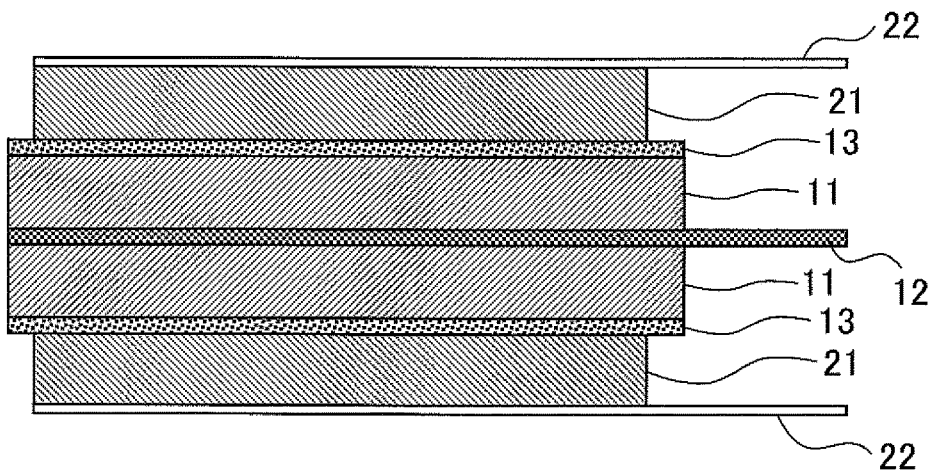
FIG. 15 is a cross-sectional schematic view of a stack after disposing positive electrode layers.

As shown in FIG. 15, step (C) according to the invention comprises disposing a positive electrode layer comprising a second electrode active material layer 21 containing a second electrode active material, and a second collector 22, on each of the solid electrolyte layers 13 disposed on the respective first electrode active material layers 11, in such a manner that the second electrode active material layers 21 are in contact with the solid electrolyte layers 13. FIG. 15 is a cross-sectional schematic view of a stack after placing positive electrode layers.

As mentioned above, according to the invention there is no clear distinction between positive electrode active materials and negative electrode active materials, and a battery with the desired voltage can be constructed by comparing the two different charge-discharge potentials and using the one exhibiting an electropositive charge-discharge potential as the positive electrode active material layer and the one exhibiting an electronegative charge-discharge potential as the negative electrode active material layer. In the invention, the first electrode active material layer 11 and the second electrode active material layer 21 may be a positive electrode active material layer and negative electrode active material layer, and the electrode active material layer of either the first electrode active material layer 11 or second electrode active material layer 21 may be either a positive electrode active material layer or a negative electrode active material layer. In other words, when the first electrode active material layer is a positive electrode active material layer, the second electrode active material layer is a negative electrode active material layer, and when the first electrode active material layer is a negative electrode active material layer, the second electrode active material layer is a positive electrode active material layer.

The thicknesses and compositions of the second electrode active material layer 21 and second collector 22 are the same as the thicknesses and compositions for the first electrode active material layer 11 and first collector 12 mentioned above.

Step (C) may comprise disposing the second electrode active material layers 21 on the second collectors 22 to form second electrode layers, and disposing the second electrode layers on the solid electrolyte layers 13 disposed on both sides, in such a manner that the second electrode active material layers 21 are in contact with the solid electrolyte layers 13.

Placement of the second electrode active material layers 21 on both sides of the second collectors 22 may be performed by using a slurry coating process, blasting, aerosol deposition, cold spraying, sputtering, vapor growth, thermal spraying or the like, with slurry coating being preferred since it allows a second electrode active material layer 21 to be obtained by a simple process.

A slurry coating process can be carried out by preparing a slurry containing the second electrode active material, and then coating and drying the prepared slurry onto either the first main surface or the second main surface of the second collector.

Preparation of a slurry containing the second electrode active material and coating and drying of the prepared slurry onto either the first main surface or the second main surface of the second collector may be carried out in step (C), or they may be carried out before step (C).

The method of preparing the slurry comprising the second electrode active material may be carried out in the same manner as the method of preparing the slurry comprising the first electrode active material, described above.

Alternatively, step (C) may comprise disposing second electrode active material layers 21 on the solid electrolyte layers 13 disposed on both sides, and disposing second collectors 22 on the second electrode active material layers 21 disposed on both sides.

Placement of the second electrode active material layers 21 on the solid electrolyte layers 13 disposed on both sides may be performed by a slurry coating process, blasting, aerosol deposition, cold spraying, sputtering, vapor growth, thermal spraying or the like, with slurry coating being preferred since it allows a second electrode active material layer 21 to be obtained by a simple process.

A slurry coating process can be carried out by preparing a slurry containing the second electrode active material, and then coating and drying the prepared slurry onto the solid electrolyte layers 13 disposed on both sides.

The slurry containing the second electrode active material may be prepared either in step (C) or before step (C).

The slurry comprising the second electrode active material may be coated and dried onto one of the solid electrolyte layers 13 disposed on both sides and then coated and dried onto the other side, or it may be coated and dried simultaneously onto the solid electrolyte layers 13 disposed on both sides, or it may be coated onto the surface of the solid electrolyte layer 13 disposed on one side and then coated onto the solid electrolyte layer 13 disposed on the other side, and the coated films on both sides simultaneously may be dried. In the stage where the slurry comprising the second electrode active material has been coated and dried, little stress is generated in the stack comprising the first collector, the first electrode active material layers disposed on both sides, the solid electrolyte layers disposed on both sides and the second electrode active material layers disposed on both sides, and the problem of warping of the stack substantially does not arise. However, preferably the slurry is coated and dried simultaneously onto the solid electrolyte layers 13 disposed on both sides.

Preparation of the slurry comprising the second electrode active material may be done in the same manner as for preparation of the slurry comprising the first electrode active material, described above.

Before disposing the second collector, a carbon adhesive may be coated onto the side of the second collector that is to contact the second electrode active material layer. The second collector may be then disposed on the second electrode active material layer. By coating a carbon adhesive on the side of the second collector that is to contact the second electrode active material layer, it is possible to improve contact between the second collector and the second electrode active material layer.

Step (D) according to the invention comprises pressing the stack comprising the second collector 22, second electrode active material layer 21, solid electrolyte layer 13, first electrode active material layer 11, first collector 12, first electrode active material layer 11, solid electrolyte layer 13, second electrode active material layer 21 and second collector 22, produced in steps (A) to (C), to produce a battery unit 30.

Throughout the present specification, the pressing in step (D) will be referred to as "main pressing". The method for pressing the stack may be carried out by using a commercially available press molding apparatus, and it may be a method, such as uniaxial pressing, cold isostatic pressing (CIP), roll pressing or hot pressing.

A preferred embodiment for the pressing method is uniaxial pressing, as illustrated in FIG. 16. FIG. 16 is a cross-sectional schematic view of a battery unit 30 produced by uniaxial pressing of a stack. Uniaxial pressing allows pressure application in a relatively short period of time, and is industrially advantageous. For example, the stack comprising the second collector 22, second electrode active material layer 21, solid electrolyte layer 13, first electrode active material layer 11, first collector 12, first electrode active material layer 11, solid electrolyte layer 13, second electrode active material layer 21 and second collector 22 may be pressed in the direction perpendicular to the stacking surface of the stack, with metal sheets placed against the second collectors 22 disposed on the upper and lower sides of the stack.

The pressing pressure for uniaxial pressing may be any desired pressure that allows a battery unit 30 to be produced. For example, in order to bond each of the layers of the stack and consolidate each layer, the pressing pressure is preferably 50 to 1000 MPa and more preferably 80 to 600 MPa. The holding time for the pressing pressure for uniaxial pressing may also be any desired time that allows production of a battery unit 30, and it is preferably 10 seconds to 5 minutes and more preferably 30 seconds to 2 minutes.

In the method of the invention, when the solid electrolyte layers 13 is disposed by transfer, the pressing pressure for transfer is preferably substantially the same as the pressure for the main pressing. More specifically, the difference between the pressing pressure for transfer and the pressure for the main pressing is preferably within 50%, more preferably within 20%, even more preferably within 10%, yet more preferably within 5%, even yet more preferably within 1% and most preferably substantially 0%, of the pressure for the main pressing. When transfer is performed two or more times to form two or more solid electrolyte layers 13, the highest transfer pressure is preferably substantially the same as the pressure for the main pressing. If the pressure for the main pressing is substantially the same as the pressing pressure for transfer, it will be possible to inhibit short circuiting between the positive electrode layer and the negative electrode layer.

In the method of the invention, when pressing is carried out after the second electrode active material layers 21 have been disposed, and then the second collectors 22 coated with a carbon adhesive are disposed and the stack is pressed, since each of the layers have already been consolidated, the pressing pressure may be lower than the aforementioned range, so long as the desired electrical connection between the second collector 22 and the second electrode active material layers 21 can still be established.

Another preferred embodiment for the pressing method is cold isostatic pressing (CIP), which allows isotropic pressing to be performed. For example, a stack comprising the second collector 22, second electrode active material layer 21, solid electrolyte layer 13, first electrode active material layer 11, first collector 12, first electrode active material layer 11, solid electrolyte layer 13, second electrode active material layer 21 and second collector 22 may be placed in a packaging material, such as a laminate, subjected to vacuum suctioning, and then subjected to press molding by cold isostatic pressing (CIP).

The pressing pressure for cold isostatic pressing may be any desired pressure that allows bonding of each of the stack layers together and consolidation of each of the layers to produce a battery unit 30, and it is preferably 300 to 1500 MPa and more preferably 500 to 1000 MPa. The holding time for the pressing pressure for cold isostatic pressing may also be any desired time that allows production of a battery unit 30, and it is preferably 10 seconds to 5 minutes and more preferably 30 seconds to 2 minutes.

Step (E) according to the invention comprises repeating steps (A) to (D) to produce a plurality of battery units 30.

The number of times that steps (A) to (D) are repeated may be determined according to the number of battery units to be stacked in step (F).

The number of battery units 30 stacked may be selected according to the desired battery characteristics. For example, steps (A) to (D) may be repeated at least 20 times in order to stack 20 layers of battery units 30 to produce an all-solid-state battery 100. The lower limit for the number of battery unit 30 stacks is 2 or greater, preferably 5 or greater and more preferably 10 or greater, with no particular restriction as the upper limit for the number of stacks, although it may be up to 1000, up to 200 or up to 100, for example. Since the battery units 30 produced by the method of the invention have virtually no warping, more battery units can be stacked than in the prior art, to produce an all-solid-state battery.

The plurality of battery units 30 produced in step (E) may be inspected for short circuiting prior to stacking in step (F). Short circuiting in the battery units 30 may be inspected, and the battery units 30 judged to have no short circuiting may be stacked in step (F). The inspection of short circuiting can be performed by measuring the voltage value of the battery unit 30, and for example, when the voltage value of the battery unit 30 is 0.01 V or greater, it may be judged that no short circuiting is present.

Step (F) according to the invention comprises stacking the plurality of battery units 30 produced in step (E), as shown in FIG. 17. FIG. 17 is a cross-sectional schematic view showing an example of an all-solid-state battery 100 produced by stacking three layers of battery units 30. The number of battery units 30 stacked may be as explained above.

Since the second collectors 22 are disposed on the outermost layers of the battery units 30, the battery units 30 are stacked so that the second collectors 22 of each battery unit 30 are in contact with each other when two or more battery units 30 are stacked. In an all-solid-state battery 100 produced by stacking a plurality of units 30, the stacking is performed in such a manner that the second collectors 22 composed of the same material are in mutual contact, and therefore interfacial resistance between the adjacent second collectors 22 can be reduced. Since interfacial resistance between the adjacent second collectors 22 can be reduced, it is not necessary to perform pressing after the battery units 30 have been stacked.

In an all-solid-state battery of the prior art as illustrated in step (IV) of FIG. 1, one positive electrode collector and one negative electrode collector are each present on the upper and lower sides of the battery unit. When a plurality of such battery units are stacked, the stacking is performed in such a manner that the positive electrode collectors and negative electrode collectors are in mutual contact, which alternately produces locations where two positive electrode collectors are disposed in contact and locations where two negative electrode collectors are disposed in contact. In contrast, an all-solid-state battery 100 produced by the method of the invention has a construction in which two second collectors 22 are disposed in contact, but the first collectors are provided with first electrode active material layers on both sides. Consequently, the volume percentage of the first collector can be reduced compared to a battery structure of the prior art, allowing the energy density per unit volume of the all-solid-state battery to be increased. More specifically, it is possible to increase the energy density per unit volume by about 10% to 20% over an all-solid-state battery of the prior art. This therefore allows the all-solid-state battery to be downsized.

Lead electrodes (collector tabs) may be connected by ultrasonic welding or the like to each of the first collectors and second collectors of an all-solid-state battery 100 produced by stacking a plurality of battery units 30. The collector tabs connected to the first collectors may be ultrasonically welded together and the collector tabs connected to the second collectors may be ultrasonically welded together. The connected positive electrode collector tabs and the connected negative electrode collector tabs may each be extended to the exterior while covering the all-solid-state battery 100 with a battery case, to construct an all-solid-state battery.

For the battery case enclosing the all-solid-state battery 100 there may be used a laminate film, metal case or the like known to be usable for all-solid-state batteries. Laminate films include resin laminate films, and films obtained by vapor deposition of metals on resin laminate films. For example, when a laminate film is used as the battery case, the all-solid-state battery 100 produced by stacking the plurality of units 30 may be placed in a laminate film, subjected to vacuum suctioning while extending the collector tabs to the exterior, and sealed. The all-solid-state battery 100 placed in the battery case can be used with application of a prescribed constraining pressure.

The all-solid-state battery 100 placed in the battery case may have any desired forms, such as cylindrical, rectilinear, button-shaped, coin-shaped or flat-shaped forms, with no limitation to these.

In the method of the invention, steps (A) to (F) may be carried out as separate steps or they may be carried out as a continuous step.

The invention further relates to an all-solid-state battery comprising two or more battery units each having a second collector, second electrode active material layer, solid electrolyte layer, first electrode active material layer, first collector, first electrode active material layer, solid electrolyte layer, second electrode active material layer and second collector stacked in that order, wherein the two or more battery units are stacked with the second collectors in mutual contact.

Since the battery units included in the all-solid-state battery of the invention have substantially no warping, the all-solid-state battery of the invention also has substantially no warping. Furthermore, since the all-solid-state battery of the invention comprises a plurality of battery units but with a reduced volume percentage of first collectors occupying the all-solid-state battery as a whole, it can exhibit higher energy density than an all-solid-state battery of the prior art.

FIG. 17 is a cross-sectional schematic drawing showing an example of an all-solid-state battery according to the invention. The all-solid-state battery 100 of the invention comprises battery units 30 each having a second collector 22, a second electrode active material layer 21, a solid electrolyte layer 13, a first electrode active material layer 11, a first collector 12, a first electrode active material layer 11, a solid electrolyte layer 13, a second electrode active material layer 21 and a second collector 22 disposed in that order, and it is formed by stacking a plurality of such battery units 30.

In the all-solid-state battery 100 of the invention, the first collector 12 has a first main surface and a second main surface, with a first electrode active material layer 11 disposed on both sides thereof. A solid electrolyte layer 13 is disposed on each of the two first electrode active material layers 11. A second electrode active material layer 21 is disposed on each of the two solid electrolyte layers 13. A second collector 22 is disposed on each of the two second electrode active material layers 21.

Each battery unit 30 is disposed with the second collectors 22 on the two outermost layers. In the all-solid-state battery 100, the units 30 are stacked in such a manner that the second collectors 22 of the battery units 30 are in contact. Since the plurality of battery units 30 are stacked in such a manner that the second collectors 22 composed of the same material are in mutual contact, low interfacial resistance between the adjacent second collectors 22 can be maintained.

The first electrode active material layer 11 and second electrode active material layer 21 are the positive electrode active material layer and negative electrode active material layer. Either the first electrode active material layer 11 or the second electrode active material layer 21 may be the positive electrode active material layer or the negative electrode active material layer.

Similarly, the first collector 12 and second collector 22 are the positive electrode collector and negative electrode collector. Either the first collector 12 or the second collector 22 may be the positive electrode collector or negative electrode collector. However, the collector disposed in contact with the positive electrode active material layer is the positive electrode collector, and the collector disposed in contact with the negative electrode active material layer is the negative electrode collector.

The first collector 12 may be electrically connected to the first electrode active material layer 11, and the second collector 22 may be electrically connected to the second electrode active material layer 21.

Lead electrodes (collector tabs) may be connected by ultrasonic welding or the like to each of the first collectors and second collectors of an all-solid-state battery 100 produced by stacking a plurality of units 30. The collector tabs connected to the first collectors may be connected by ultrasonic welding or the like and the collector tabs connected to the second collectors may be connected by ultrasonic welding or the like. The connected positive electrode collector tabs and the connected negative electrode collector tabs may each be extended to the exterior while covering the all-solid-state battery 100 with a battery case as described above, to construct an all-solid-state battery.

The number of unit 30 stacks may be selected according to the desired battery characteristics. The lower limit for the number of stacks is preferably 2 or greater, more preferably 5 or greater and more preferably 10 or greater. Although there is no particular restriction on the upper limit for the number of stacks, it may be, for example, up to 1000, up to 200 or up to 100. For example, 20 layers of units 30 may be stacked to produce the all-solid-state battery 100.

In the all-solid-state battery 100 of the invention, the size of the second electrode active material layer 21 may be the same size as the first electrode active material layer 11, or it may be smaller than the first electrode active material layer 11. FIG. 16 and FIG. 17 are cross-sectional schematic drawings showing battery units 30 wherein the size of the second electrode active material layers 21 is smaller than that of the first electrode active material layers 11.

When the size of the second electrode active material layers 21 is smaller than that of the first electrode active material layers 11, preferably each second electrode active material layer 21 is a positive electrode active material layer and each first electrode active material layer 11 is a negative electrode active material layer. Making the size of the positive electrode active material layers smaller than the negative electrode active material layers in this way will further help minimize short circuiting between the positive electrode active material layers and the negative electrode active material layers.

In the all-solid-state battery 100 of the invention, the thicknesses of the first electrode active material layers 11 and second electrode active material layers 21 as the positive electrode active material layers and negative electrode active material layers may be selected according to the desired battery characteristics, and they are preferably 1 to 1000 μm and more preferably 5 to 200 μm.

The thicknesses of the solid electrolyte layers 13 in the all-solid-state battery 100 of the invention may be selected according to the desired battery characteristics, and are preferably 0.1 to 1000 μm, more preferably 1 to 100 μm and even more preferably 10 to 50 μm. The thicknesses of the solid electrolyte layers 13 are preferably as thin as possible within a range that can minimize short circuiting between the first electrode active material layers 11 and the second electrode active material layers 21.

The first electrode active material layers 11 and second electrode active material layers 21 each comprise an active material, and optionally a solid electrolyte material, conductive aid and binder. The solid electrolyte layers 13 each comprise a solid electrolyte material, and may also optionally comprise a binder. The materials for the active material, solid electrolyte material, conductive aid and binder may be the materials mentioned above for production method of the invention. The other embodiments of the construction of the first electrode active material layers 11, second electrode active material layers 21 and solid electrolyte layers 13 are as described for the production method of the invention. The embodiments of the construction of the first collector 12 and the second collector 22 are also as described for the production method of the invention.

EXPLANATION OF SYMBOLS

1 Positive electrode active material layer
2 Solid electrolyte layer
3 Negative electrode active material layer
4 Positive electrode collector
5 Negative electrode collector
6 Substrate
7 Stack
8 Aluminum sheet
9 Resin coating
10 Aluminum laminate
11 First electrode active material layer
12 First collector 12
121 First main surface of first collector
122 Second main surface of first collector
13 Solid electrolyte layer
14 Substrate
15 First electrode layer
21 Second electrode active material layer
22 Second collector
30 Battery unit
51 Negative electrode collector tab
52 Transparent tape
53 Positive electrode collector tab
54 Transparent tape
100 All-solid-state battery

What is claimed is:

1. A method for producing an all-solid-state battery, comprising the steps of:
   (A) disposing a first electrode active material layer containing a first electrode active material on both sides of a first collector having a first main surface and a second main surface, to form a first electrode layer,
   (B) disposing a solid electrolyte layer containing a solid electrolyte on each of the first electrode active material layers disposed on both sides,
   (C) disposing a second electrode active material layer containing a second electrode active material, and a second collector, on the solid electrolyte layers disposed on each of the first electrode active material layers, in such a manner that the second electrode active material layers contact with the solid electrolyte layers,
   (D) pressing a stack comprising the second collector, second electrode active material layer, solid electrolyte layer, first electrode active material layer, first collector, first electrode active material layer, solid electrolyte layer, second electrode active material layer and second collector, formed in steps (A) to (C), to form a battery unit at a pressing pressure of 50 to 1000 MPa,
   (E) repeating steps (A) to (D) to form a plurality of battery units, and
   (F) stacking the plurality of battery units,
   wherein, when the first electrode active material layer is a positive electrode active material layer, the second electrode active material layer is a negative electrode active material layer, and when the first electrode active material layer is a negative electrode active material layer, the second electrode active material layer is a positive electrode active material layer.

2. The method according to claim 1, wherein the method comprises:
   providing substrates,
   preparing a slurry containing the solid electrolyte, and
   coating and drying the slurry onto the substrates to form solid electrolyte films containing the solid electrolyte, and
   wherein step (B) comprises:
   simultaneously transferring the solid electrolyte film formed on the substrate onto each of the first electrode active material layers disposed on both sides, to dispose the solid electrolyte layers.

3. The method according to claim 1, wherein the method comprises preparing a slurry containing the first electrode active material, and\
   wherein step (A) comprises:
   coating and drying the slurry onto both sides of the first collector having the first main surface and second main surface, to dispose the first electrode active material layer containing the first electrode active material on both sides of the first collector.

4. The method according to claim 1, wherein step (D) comprises uniaxial pressing the stack in the direction perpendicular to the stacking surface of the stack.

5. The method according to claim 1, wherein step (C) comprises:
   disposing the second electrode active material layer on the second collector to form a second electrode layer, and
   disposing the second electrode layer on the solid electrolyte layers disposed on each of the first electrode active material layers, in such a manner that the second electrode active material layers contact with the solid electrolyte layers.

6. The method according to claim 1, wherein step (C) comprises:
- disposing the second electrode active material layers on the solid electrolyte layers disposed on each of the first electrode active material layers, and
- disposing the second collectors on the second electrode active material layers disposed on each of the solid electrolyte layers.

* * * * *